Patented Oct. 28, 1930

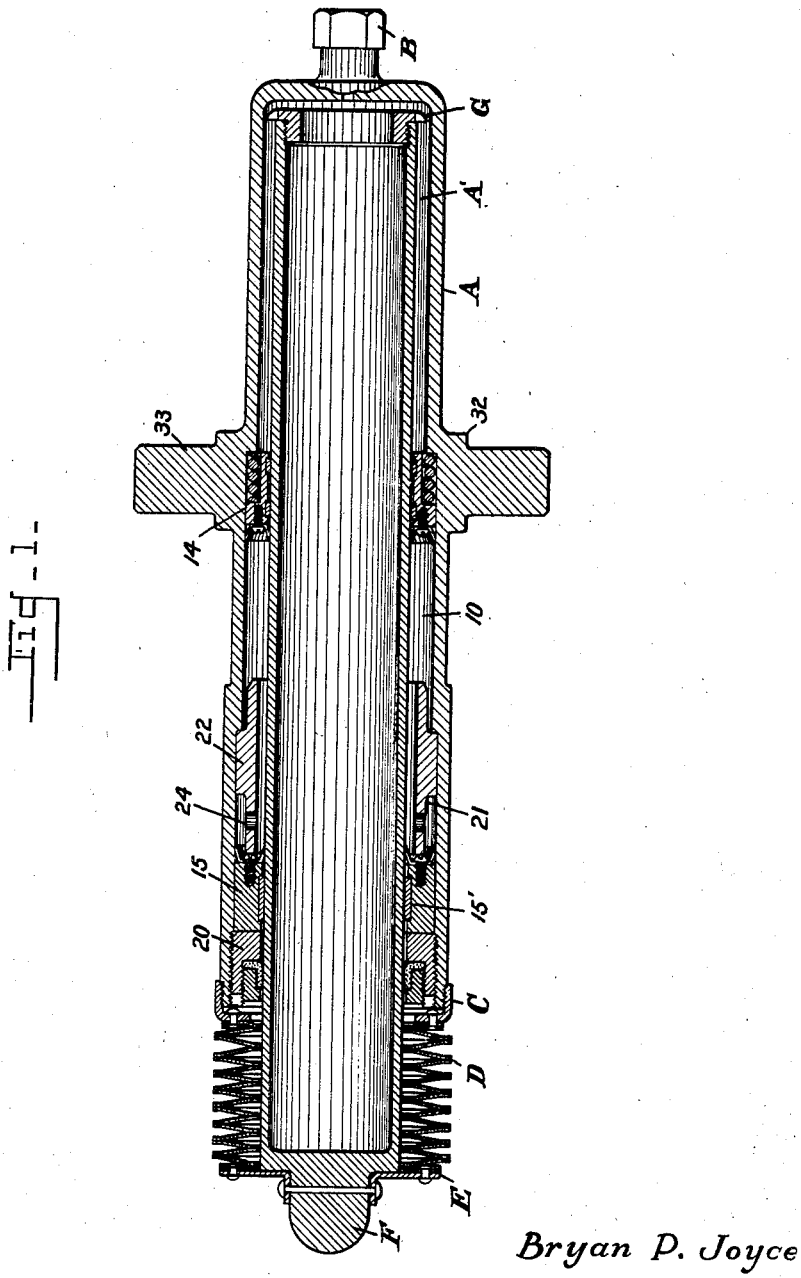

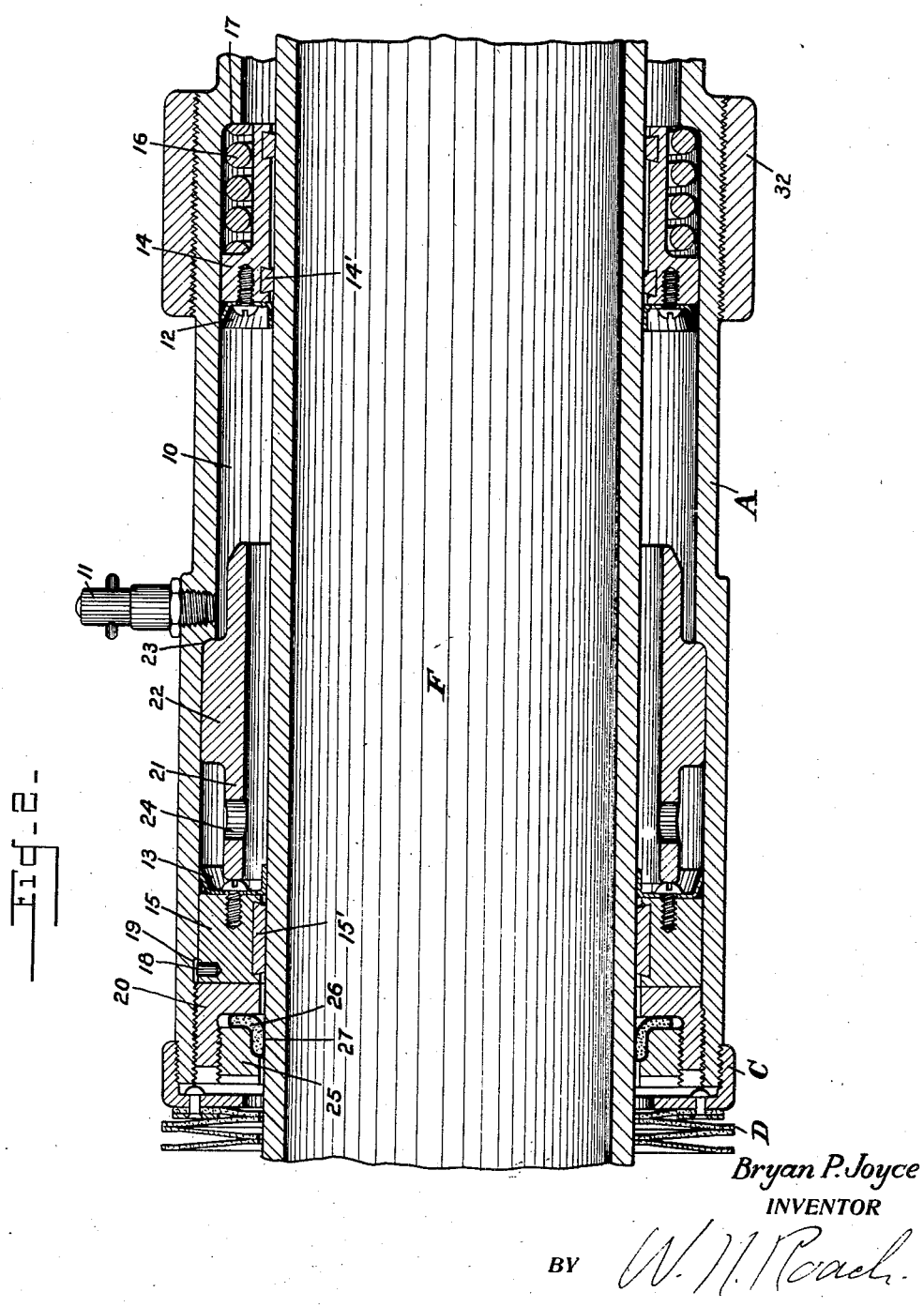

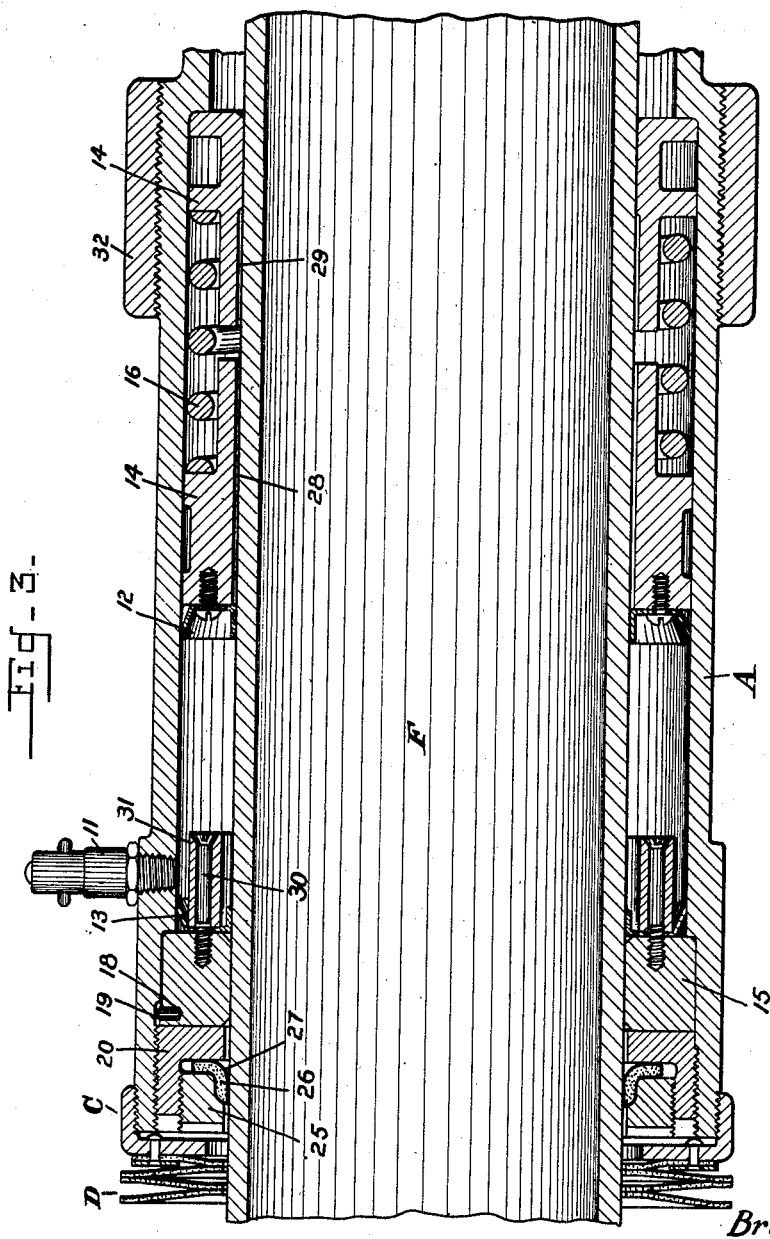

1,779,938

UNITED STATES PATENT OFFICE

BRYAN P. JOYCE, OF DAVENPORT, IOWA

PACKING FOR HOLDING FLUIDS UNDER PRESSURE

Application filed July 21, 1924. Serial No. 727,400.

(GRANTED UNDER THE ACT OF MARCH 3, 1883, AS AMENDED APRIL 30, 1928; 370 O. G. 757)

The invention described herein may be manufactured and used by or for the Government for governmental purposes without the payment to me of any royalty thereon.

The subject of this invention is a packing for holding fluids under pressure.

The primary object of this invention is to provide means for preventing escape of a confined fluid by utilizing its pressure to compress a sealing fluid which also acts as a packing for a piston.

Other objects and advantages are to provide means when leakage occurs for automatically equalizing the pressures in the fluid chambers and to provide means which will not interfere with lubrication for limiting the movement of the packing ring which separates the fluid chambers.

To these and other ends, my invention consists in the construction, arrangement, and combination of elements, described hereinafter and pointed out in the claims forming a part of this specification.

Several embodiments of my invention are illustrated in the accompanying drawings, in which the device is shown applied to a pneumatic equilibrator for guns.

Fig. 1 is a longitudinal sectional view of an equilibrator showing my improved packing in position;

Fig. 2 is an enlarged longitudinal sectional view of a fragment of the equilibrator; and Fig. 3 is a sectional view of a modified form of packing.

Referring to the drawings by numerals of reference:

An equilibrator casing A closed at one end is provided with a valve B through which fluid under pressure, specifically compressed air, may be admitted to a chamber A' in the casing. Threadedly secured to the opposite end of the casing is an apertured head C to which is fastened one end a collapsible tubing D, the other end of which is secured to a collar E fastened to a piston element, specifically a tubular plunger F reciprocal within the casing. The purpose of the collapsible tube is to protect the plunger from dust and other foreign substances. The plunger has threadedly secured to its inner end an apertured head G.

To prevent the escape of the air from the chamber A', a packing is interposed between the plunger and the casing to form a chamber 10, in which a fluid such as heavy oil or grease is introduced through a valve 11 to properly lubricate and seal the packing. The fluid in the chamber A' will be under a fluctuating pressure while the fluid in the chamber 10 will be under a normally constant pressure.

Referring to Figure 2, the lubricant is confined between a forward cup ring 12 and a rear cup ring 13 which are screwed or otherwise suitably secured to packing rings 14 and 15, the forward ring 14 separating the chambers A' and 10. The walls of the cup rings are formed at right angles to the bridging portion of the ring so that they will be disposed parallel to the casing and piston. The packing rings are internally grooved to carry anti-friction metal bands 14'—15', preferably of tin, which contacts the plunger.

The forward packing ring 14 is in the form of a sleeve to protect the polished surface of the plunger from a spiral spring 16 confined between flanged portion of the ring 14 and an annular shoulder 17 formed on the interior of the casing A. The spring 16 constantly forces the cup ring 12 against the grease in the chamber 10 to maintain the seal.

The rear packing ring carries a pin 18, which projects into a slot 19 formed in the casing to prevent rotation of the ring when a retaining nut 20 is screwed in place. The nut serves to stationarily hold the rear packing ring in place against a ring 21 spaced from the plunger and formed with a flange 22 which abuts against an annular shoulder 23 of the casing. The rear portion of the ring 21 is provided with apertures 24 to permit free passage of the grease in the sealing chamber, while the forward portion prevents the cup ring 12 from moving to the rear a sufficient distance to obstruct the valve 11.

The retaining nut 20 is countersunk and tapped for the reception of a metal ring 25, which holds in place a leather wiper 26 encased in tinfoil 27, the function of which is to polish the plunger and to prevent the tanning chemicals of the leather from pitting the polished surface of the plunger.

In the modified form shown in Figure 3, the forward packing ring 14 is formed in two parts, one of which is spaced as at 28 from the plunger throughout the entire length and the other spaced as at 29 through a portion of its length to permit the grease from the sealing chamber to lubricate the moving parts.

The cup rings 12 and 13 are formed with an outer inclined wall to contact the stationary casing while the inner wall is formed at right angles to the bridging portion of the ring so that it will be in parallel contact with the plunger so that the polished surface of the plunger will not be scored.

The rear cup ring 13 is secured to the packing ring 15 by a screw 30 which also serves to retain a ring 31 corresponding in function to the ring 21 of Figure 2.

Should leakage occur in the chamber A' to the chamber 10 and then the pressure in the chamber A' lowered by withdrawal of the plunger, the spring 16 will be compressed thereby equalizing the pressure in the grease chamber 10 and in the fluid chamber A'.

The casing A has formed thereon or secured thereto a trunnion band 32 (see Fig. 1) and trunnions 33 for mounting the device on a gun carriage.

While in the foregoing there has been illustrated and described such combination and arrangement of elements as constitute the preferred embodiment of my invention, it is nevertheless desired to emphasize the fact that interpretation of the invention should only be conclusive when made in the light of the subjoined claims.

I claim:

1. The combination with a casing and a member movable therein, of a packing immovable with respect to the casing including a cup ring and a spacing member seated within the cup ring provided with means for directing pressure fluid to said ring, a resiliently held packing spaced from said stationary packing, thereby forming a fluid pressure chamber between said packings and means for admitting fluid under pressure to said chamber.

2. In a pressure fluid machine, a packing between relatively movable parts thereof, said packing comprising a chamber full of fluid closed at its ends by metal packing rings, resilient means adapted to cooperate with the machine fluid to maintain the packing fluid under greater pressure than the machine fluid and means to permit replenishment of the packing fluid.

3. In a pressure fluid machine, a packing between relatively movable parts thereof, said packing comprising a chamber full of fluid closed at its ends by metal packing rings and resilient means cooperating with one of the packing rings and the machine fluid to maintain the packing fluid under greater pressure than the machine fluid.

4. In a pressure fluid machine, a packing between relatively movable parts thereof, said packing comprising metal packing rings mounted between said parts to form a chamber between them, said chamber being full of fluid and resilient means adapted to cooperate with the machine fluid to maintain the packing fluid under greater pressure than the machine fluid adjacent the packing.

5. In a pressure fluid machine, a packing between relatively movable parts thereof, said packing comprising metal packing rings mounted between said parts to form a chamber between them, said chamber being full of fluid and resilient means adapted to cooperate with the machine fluid to vary the pressure of the packing fluid with the pressure of the machine fluid and to maintain the packing fluid under greater pressure than the machine fluid adjacent the packing.

BRYAN P. JOYCE.